United States Patent [19]

Frishberg

[11] 4,273,926
[45] Jun. 16, 1981

[54] AZO DYES FROM 2-AMINO-5-STYRYL-1,3,4-THIADIAZOLES

[75] Inventor: Mark D. Frishberg, Kingsport, Tenn.

[73] Assignee: Eastman Kodak Company, Rochester, N.Y.

[21] Appl. No.: 119,697

[22] Filed: Feb. 8, 1980

Related U.S. Application Data

[62] Division of Ser. No. 6,965, Jan. 25, 1979.

[51] Int. Cl.³ .......................................... C07D 285/12
[52] U.S. Cl. ................................. 542/458; 260/158; 548/138
[58] Field of Search ......................... 548/138; 542/458

[56] References Cited

U.S. PATENT DOCUMENTS 3,794,665  2/1974  Berkelhammer et al. ........... 542/466

OTHER PUBLICATIONS

Elderfield, Heterocyclic Compounds, vol. 7, John Wiley & Sons, N.Y., N.Y., 1962, p. 595.
Tsurkan et al., Chem. Abstracts 80(1974) #82836.
Maekawa et al., Chem. Abstracts 85(1976) #46731.
De et al., Chem. Abstracts 22(1928) p. 4123.

Primary Examiner—Arthur P. Demers
Attorney, Agent, or Firm—Donald W. Spurrell; Daniel B. Reece, III

[57] ABSTRACT

Disclosed are azo dyes having the general formula

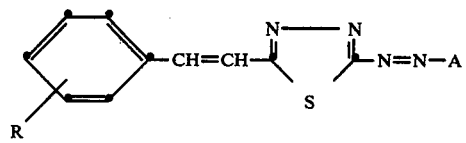

in which R is hydrogen, $-NO_2$, $-CN$, halogen, alkoxy, alkyl, alkoxycarbonyl, or $CF_3$, and A is the residue of an aniline, tetrahydroquinoline or benzomorpholine disperse dye coupling component. These dyes produce red to blue shades on polyester fibers and exhibit one or more improved properties such as dyeability, light fastness, pH stability, build, and the like on polyester, polyamide and cellulose ester fibers.

1 Claim, No Drawings

AZO DYES FROM 2-AMINO-5-STYRYL-1,3,4-THIADIAZOLES

This is a division of Application Ser. No. 6,965 filed Jan. 25, 1979.

This invention concerns azo dyes having the general formula

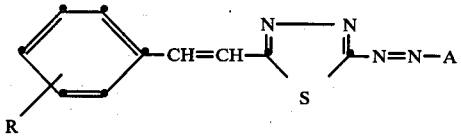

in which R is hydrogen, $NO_2$, CN, halogen, alkoxy of 1-8 carbons, alkyl of 1-8 carbons, alkoxycarbonyl of 1-8 carbons, or $CF_3$, and A is the residue of an aniline, tetrahydroquinoline or benzomorpholine disperse dye coupling component. The dyes wherein R is —H or —$NO_2$ are preferred. These dyes produce red to blue shades on polyester fibers and exhibit one or more improved properties such as dyeability, light fastness, pH stability, build, fastness to ozone and nitrogen oxide, crock and washing fastness, migration, transfer and pH stability on polyester, polyamide and cellulose ester fibers.

The couplers useful in the present invention have the formulae

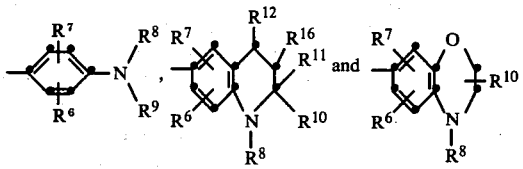

wherein $R^6$ and $R^7$ are each selected from hydrogen, fluorine, chlorine, bromine, lower alkyl, cycloalkyl, lower alkoxy, phenoxy, lower alkylthio, arylthio, and radicals having the formula —NH—X—$R^{13}$ in which X is —CO—, —COO—, or —$SO_2$— and $R^{13}$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is —CO—, $R^{13}$ also can be hydrogen, amino, lower alkylamino, lower alkylcarbamoyl, lower dialkylamino, arylamino, aryl, or furyl;

$R^8$ and $R^9$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1-8 carbons and such alkyl substituted with the following: hydroxy; halogen; cyano; succinimido; glutarimido; phthalimido; 2-pyrrolidono; cyclohexyl; phenyl or phenyl substituted with lower alkyl, lower alkoxy, halogen, lower alkanoylamino, cyano or lower alkoxycarbonyl; lower alkanoylamino; sulfamoyl; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; groups of the formula

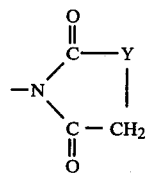

wherein Y is —NH—, —NH—lower alkyl, —O—, —S—, or —$CH_2O$—; —S—$R^{14}$ wherein $R^{14}$ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, triazolyl, or

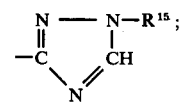

—$SO_2R^{13}$; —$COOR^{13}$; —$OXR^{13}$; —NH—X—$R^{13}$; —X—$R^{13}$; —OCO—$R^{13}$; —$CONR^{15}R^{15}$; —$SO_2NR^{15}R^{15}$; wherein $R^{13}$ and X are as defined above and each $R^{15}$ is selected from H and $R^{13}$; lower alkoxy; lower alkoxy substituted with hydroxy, cyano, lower alkanoyloxy, or lower alkoxy; phenoxy, phenoxy substituted with one or more of lower alkyl, lower alkoxy or halogen; and $R^8$ and $R^9$ can be a single, combined group which, with the nitrogen atom to which each is attached, forms a ring such as pentamethylene, ethyleneoxyethylene, ethylenesulfonylethylene;

$R^{10}$, $R^{11}$ and $R^{12}$ are each selected from hydrogen and lower alkyl; and $R^{16}$ is selected from —OH, —Cl, —$CONH_2$, —CONH—lower alkyl, lower alkoxy, phenoxy, —$SR^{14}$, and —$OXR^{13}$ wherein $R^{13}$ and $R^{14}$ are as defined above.

The couplers are prepared by procedures well known in the art and such couplers are disclosed in general in the patent literature, e.g., U.S. Pat. Nos. 2,805,218; 2,827,450; and 2,839,523.

The azo moiety is prepared, for example, by the oxidative ring closure of cinnamaldehyde thiosemicarbazone as follows:

PREPARATION OF CINNAMALDEHYDE THIOSEMICARBAZONE

A solution of 18.2 g (0.20 m) of thiosemicarbazide in 250 ml of hot water was gradually added to a solution of 26.4 g (0.20 m) of cinnamaldehyde in 250 ml of hot 2 B ethanol. Small, colorless crystals began to ppt from the homogeneous mixture after several minutes of heating on a steam bath. Heating was continued for a half an hour, after which the mixture was cooled to room temperature and the product was collected by filtraton, washed with cold ethanol, and air-dried to yield 25.5 g of small, pale yellow crystals. An additional 18.3 g of product was recovered by concentrating the mother liquors. Recrystallization from ethanol gave 29.3 g (0.14 m) of small, pale yellow crystals, m.p. 137°–139° C.

PREPARATION OF β-(5-Amino-1,3,4-Thiadiazol-2-yl)Styrene

A mixture of 70.0 g (0.35 m) of cinnamaldehyde thiosemicarbazone and 56.0 g (1.16 m) of ferric ammonium sulfate dodecahydrate was pulverized with a mortar and pestle and added portionwise to 1400 ml of hot water. The mixture was stirred at 60°–100° C. for 1¼ hr., during which time the color of the mixture changed from yellow-orange to dark red and much of the solid material went into solution. The mixture was filtered hot to yield 54.5 g of a brown granular product. The mother liquors were cooled under refrigeration and refiltered to give another 12.3 g of product. The crude product was pulverized and triturated twice with chloroform to remove the residual starting material and the dark brown impurities from the product, leaving 27.4 g of a beige microcrystalline powder. An additional 4.60 g of product was recovered by concentrating the chloroform filtrate. Total yield was 32.0 g (0.16 m), mp. 212°–214° C. (dec.). This procedure is novel and is of general utility for preparing these types of compounds. The novel procedure for this particular product is defined as:

The process for the preparation of the compound

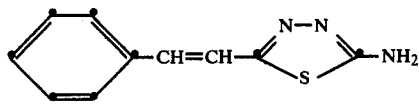

comprising reacting in water at from about 40° to about 100° C., ferric ammonium sulfate dodecahydrate and cinnamaldehyde thiosemicarbazone wherein the reactants are present in a mole ratio of from about 1:1 to about 5:1.

PREPARATION OF β-(5-ACETAMIDO-1,3,4-THIADIAZOL-2-YL)-P-NITROSTYRENE

A mixture of 21.4 g (0.186 m) of 2-amino-5-methyl-1,3,4-thiadiazole and 380 ml of acetic anhydride was refluxed 1 hr., after which 28.0 g (0.186 m) of p-nitrobenzaldehyde was added and the reaction mixture was refluxed for an additional 16 hrs. After cooling, the solid product was collected on a Buchner funnel, washed in acetone, and air-dried to yield 26.6 g (0.092 m, 49.4%) of the acetamide as a light yellow powder. Purification by washing in hot acetone/dimethylformamide (50/50) yielded small yellow crystals, MP. 341.5°–342.5° C. (dec).

PREPARATION OF β-(5-AMINO-1,3,4-THIADIAZOL-2-YL)-P-NITROSTYRENE

A mixture of 19.23 g (0.0664 m) of β-(5-acetamido-1,3,4-thiadiazol-2-yl)-p-nitrostyrene, 140 ml of acetic acid, and 140 ml of conc HCl was heated on a steam bath for 5 hr. The reaction mixture was cooled, poured into an equal amount of ice and water, and neutralized with conc HN₄OH. The product was collected on a Buchner funnel, washed with water, and air-dried to yield 15.84 g (0.0637 m, 96%) of the amine as a yellow-tan microcrystalline powder, MP. 289°–291° C. (dec).

The dyes were prepared by the following general procedure:

Sodium nitrite (1.80 g, 0.025 m) was added portionwise with stirring to 13 ml of concentrated $H_2SO_4$ below 80° C. The resulting nitrosylsulfuric acid solution was cooled, 25 ml of 1:5 acid (1 part propionic, 5 parts acetic) (6.22 g, 0.025 m) was added below 20° C., and β-(5-amino-1,3,4-thiadiazol-2-yl)styrene was added portionwise below 0° C., followed by 25 ml additional 1:5 acid. After stirring for 4 hr. at −5° to 0° C., the diazo solution was divided into ten equal portions. A portion was added slowly with stirring to an ice cold solution of 0.0025 m of coupler in 20 ml of 1:5 acid (couplers containing hydroxyl substituents were dissolved in 15% $H_2SO_4$). The resulting mixture was neutralized with solid ammonium acetate, allowed to stand at 0° C. for 1 hr., and the dye was precipitated with water. The solid dye was collected by filtration, washed with water until the filtrates were colorless, and air-dried. The crude dye was purified by slurrying in hot methanol.

The dyes of this invention can be applied to synthetic polyamide, polyester, and cellulose acetate fibers according to known disperse dyeing techniques. Various dispersing and wetting agents can be employed in the dispersion of the finely divided dye compound in an essentially aqueous dyebath. Procedures by which the present dyes can be applied to polyamide textile materials are described, for example, in U.S. Pat. Nos. 3,100,134 and 3,320,021. Typically, the azo compound (16.7 mg.) is dispersed in 10 cc. of 2-methoxyethanol. A small amount (3–5 cc.) of a 3% sodium lignin sulfonate solution is added, with stirring, and the volume of the bath brought to 150 cc. with water. A 5 g. textile fabric made of nylon 66 fibers is placed in the bath and worked 10 minutes without heat. The path is then slowly brought to the boil over a 30-minute period and the dyeing is carried out at the boil for one hour. The dyed fabric is then removed from the dyebath, rinsed with water and dried in an oven at 250° F. Fabric samples thus dyed with the present dyes exhibit one or more of the improved properties set forth above when tested in accordance with the procedures described, for example, in the Technical Manual of the American Association of Textile Chemists and Colorists, 1968 edition.

A typical general procedure by which polyester, e.g., poly(ethylene terephthalate) can be dyed with the present dyes is as follows. The dye cake is dispersed by heating and agitating a dyepot containing the dye cake and methyl cellosolve. When the dyecake has been ground free of lumps and dissolved as much as possible in the methyl cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetracetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 120° F. and rotation thereof started. The temperature of the Launder-Ometer is raised to 265° F. at the rate of about 5° F. per minute, and maintained at this temperature for 1 hour. The Launder-Ometer is then cooled, and the fabric samples removed and scoured in demineralized water containing 1 g/l of neutral soap and 1 g/l sodium carbonate. The samples are rinsed in cold demineralized water and dried at 250° F. in a forced air oven.

The following tables show exemplary dyes of the present invention.

TABLE 1

| R | X | Y | R₁ | R₂ |
|---|---|---|-----|-----|
| H | H | H | —CH₂CH₃ | —CH₂CH₂OCOCH₃ |
| H | " | " | " | —CH₂CH₂CN |
| NO₂ | " | " | —CH₂CH₂OCOCH₃ | —CH₂CH₂OCOCH₃ |
| H | " | " | —CH₂CH₂CN | —CH₂CH₂OH |
| " | " | " | " | —CH₂CH₂OCOCH₃ |
| " | " | " | " | —CH₂CH₂CN |
| " | " | " | —CH₂CH₃ | —CH₂CH₂OH |
| H | " | " | " | —CH₂CH₂—N(succinimide) |
| " | " | " | —CH₂CH₂CN | —CH₂CH₂OCOC₆H₅ |
| " | " | " | " | —CH₂CH₂CH₂CH₃ |
| " | " | " | —CH₂CH₃ | —CH₂C₆H₅ |
| " | " | " | —C₆H₁₁ | —CH₂CHCH₂OH with OH |
| " | " | " | " | —CH₂CH₂OH |
| " | " | " | —CH₂CH₃ | —CH₂CH₃ |
| " | " | " | " | " |
| H | " | " | —CH₂CH₂OCH₃ | —CH₂CH₂COCH₃ |
| " | —CH₃ | " | —CH₂CH₂OH | —CH₂CH₂OH |
| " | " | " | " | —CH₂CH₃ |
| " | " | " | —CH₂CH₂OCOCH₃ | —CH₂CH₂OCOCH₃ |
| " | " | " | —CH₂CH₃ | —CH₂CHCH₂OH with OH |
| " | " | " | " | —CH₂CH₂CN |
| " | " | " | " | —CH₂CH₂Cl |
| " | " | " | " | —CH₂CH₂OCOCH₃ |
| CF₃ | " | " | —CH₂CH₂SO₂CH₂CH₂— | |
| H | —NHCOCH₃ | " | —CH₂CH₃ | —CH₂CH₃ |
| " | " | " | " | —CH₂CH₂CN |
| " | " | " | —CH₂CH₂OCOCH₃ | —CH₂CH₂OCOCH₃ |
| CN | " | —CH₃ | —H | —CH₂CH₂CN |
| H | " | " | " | —CH(CH₃)CH₂CH₃ |
| NO₂ | H | —OCH₃ | H | —thienyl (S ring) |
| Cl | —CH₃ | H | —CH₂CH₃ | —CH₂CH₂SO₂NH₂ |
| H | —NHCOCH₃ | H | H | —CH₂—C₆H₅ |
| " | " | " | " | —CH₂CH₂OCH₃ |
| " | " | " | " | —CH₂CH₃ \| CH₂CO₂CH₂CH₃ |
| H | " | " | " | —CH—CH₂CH(CH₃)₂ \| CH₂CH(CH₃)₂ |
| " | " | " | " | —CH₂(CH₂)₄CH₂OH \| OH |
| " | " | " | " | —CH(CH₃)—CH₂CH₃ |
| " | H | CH₃ | " | —thienyl (S ring) |
| Br | H | H | H | CH₂CH₂CN |
| CO₂CH₃ | " | " | CH₃ | CH₃ |
| H | " | " | CH₂CH₃ | CH₂CH₃ |
| " | " | " | " | CH₂C₆H₅ |
| " | " | " | " | C₆H₁₁ |
| " | " | " | " | CH₂CH₂OH |
| " | " | " | " | CH₂CH₂OCOCH₃ |
| " | " | " | " | CH₂CH(OH)CH₂OH |
| " | " | " | " | CH₂CH₃CN |
| CH₃ | " | " | CH₂CH₃CN | " |
| H | " | " | " | CH₂CH₂OH |
| " | " | " | " | CH₂CH₂OCOCH₃ |

TABLE 1-continued

| R | X | Y | R₁ | R₂ |
|---|---|---|----|----|
| " | " | " | " | CH₂CH₂OCOC₆H₅ |
| " | " | " | CH₂CH₂OH | CH₂CH₂OH |
| H | " | " | CH₂CH₂OCOCH₃ | CH₂CH₂OCOCH₃ |
| OCH₃ | " | " | —C₂CH₂SO₂CH₂CH₃— | |
| H | Cl | Cl | H | CH₂CH₂CN |
| H | CH₃ | H | CH₂CH₃ | CH₂CH—CH₂OCOCH₃ <br>        \|  <br>        OCOCH₃ |
| H | CH₃ | H | " | CH₂CH₃ |
| " | " | " | " | CH₂CH₂OH |
| " | " | " | " | CH₂CH₂NH₂ |
| " | " | " | CH₂CH₃ | " |
| " | " | " | CH₂CH₂CN | " |
| " | NHCOCH₃ | " | CH₂CH₃ | CH₂CH₃ |
| " | " | " | " | CH₂CH₂OCOCH₃ |
| " | " | " | " | (CH₂CH₂O)₂CH₂CH₃ |
| " | NHCOC₆H₅ | " | " | CH₂CH₂CONH₂ |
| " | " | CH₃ | H | CH₂CH₃ |
| NO₂ | NHCOCH₃ | OCH₃ | CH₂CH₃ | " |
| " | " | " | " | CH₂CH₃OCOCH₃ |
| " | " | " | " | CH₂CH(OH)CH₃ |
| " | " | " | CH₂CH₂OH | CH₂CH₂OH |
| " | " | " | CH₂CH₂OCOCH₃ | CH₂CH₂OCOCH₃ |
| " | " | " | CH₂CH₃ |  |
| " | " | H | CH₂CH₃ |  |
| " | " | " | " |  |

TABLE II

| R | R⁶, R¹⁰, R¹¹, R¹², R¹⁶ | R⁸ |
|---|------------------------|-----|
| H | 2,6-di-CH₃ | —C₂H₄OH |
| H | 2,5-di-CH₃—8-OCH₃ | —CH₂CH(OH)CH₂OH |
| H | 2,2,4,7-tetra-CH₃ | —C₂H₄CONH₂ |
| NO₂ | 2,2,4-tri-CH₃ | —C₂H₄NHCOCH₃ |
| NO₂ | 2-CH₃—7-NHCOCH₃ | —C₂H₄CN |
| NO₂ | 2,2,4-tri-CH₃—7-NHCOCH₃ | —C₂H₄Cl |
| H | 2,—CH(CH₃)₂—7-NHCOCH₃ | —C₂H₄OOCH₃ |
| NO₂ | 7-CH₃ | —C₂H₄OC₂H₅ |
| CN | 3-CN—7-CH₃ | —C₂H₄CONHC₂H₅ |
| Cl | 3-CONH₂—7-CH₃ | —C₂H₄CONH(C₂H₅)₂ |
| H | 3-Cl—7-CH₃ | —C₂H₄CONHCH₂C₆H₅ |
| NO₂ | 3-OCH₃—7-CH₃ | —C₂H₄OOCOC₂H₅ |
| CN | 2,2,4-di-CH₃—5,8-di-OCH₃ | —C₂H₄NHCOCH=CH₂ |
| OCH₃ | 2,2,4-tri-CH₃—8-OCH₃ | —CH₂C₆H₅ |
| H | 2-CH₃—7-NHCOCH₃ | —C₂H₄CONHCH₂OH |
| NO₂ | 3-OH—7-CH₃ | —C₃H₆NHCONHC₂H₅ |
| CN | 2,7-di-CH₃ | —C₂H₅ |
| Cl | 2,5-di-CH₃—8-OCH₃ | —C₂H₄SO₂NH₂ |
| H | 2,2,4,7-tetra-CH₃ | —C₂H₄SO₂NHC₂H₅ |
| NO₂ | 2,2,4-tri-CH₃ | —C₂H₄SCH₃ |

TABLE II-continued $$\text{R}-\text{C}_6\text{H}_3-\text{CH}=\text{CH}-\underset{\underset{S}{\vert}}{C}=\underset{N}{\overset{N}{\Vert}}-C-N=N-\text{Naphthyl}(R^6,R^8,R^{10},R^{11},R^{12},R^{16})$$

| R | $R^6, R^{10}, R^{11}, R^{12}, R^{16}$ | $R^8$ |
|---|---|---|
| CN | 2-CH₃—7-NHCOCH₃ | —CH₂CH₂S—C(=N-C₆H₄-S-)  (benzothiazole) |
| Cl | 2,2,4-tri-CH₃—7-NHCOCH₃ | —CH₂CH₂—S—C(=N)—NH—CH=N (imidazoline) |
| H | 2,—CH(CH₃)₂—7-NHCOCH₃ | —CH₂CH₂N(COCH₂)(COCH₂) |
| NO₂ | 7-CH₃ | —C₂H₄O—C₆H₅ |
| CN | 3-CN—7-CH₃ | —C₂H₄—N(CO—N—CH₃)(CO—CH₂) |
| Cl | 3-CONH₂—7-CH₃ | —CH₂CHCH₂OH with OH |
| H | 3-Cl—7-CH₃ | —C₂H₄—N(CO—O)(CO—CH₂) |
| NO₂ | 3-OCH₃—7-CH₃ | —C₂H₄—N(CO—CH₂)(CO—CH₂) |
| CF₃ | 2,2,4-di-CH₃—5,8-di-OCH₃ | —C₂H₄—N(COCH₂)(CH₂)(COCH₂) |
| CO₂CH₃ | 2,2,4-tri-CH₃—8-OCH₃ | —C₂H₄—N(CO)(C₆H₄)(CO) |
| H | 2-CH₃—7-NHCOCH₃ | —C₂H₄—N(CO—NH)(CO—CH₂) |
| NO₂ | 3-OH—7-CH₃ | —C₂H₄—N(COCH₂)(O)(COCH₂) |
| CN | 2,7-di-CH₃ | —C₂H₄—N(CO—C₆H₄—SO₂) |
| Cl | 2,5-di-CH₃—S—OCH₃ | —C₂H₄—N(CO—S)(CO—CH₂) |

TABLE II-continued

Structure: R-phenyl-CH=CH-C(thiadiazole)-N=N-naphthalene with substituents R⁶, R⁸, R¹⁰, R¹¹, R¹², R¹⁶

| R | R⁶, R¹⁰, R¹¹, R¹², R¹⁶ | R⁸ |
|---|---|---|
| H | 2,2,4,7-tetra-CH₃ | $-C_2H_4-S-C(=N-NC_2H_4CN)-N=CH-$ (triazole ring) |
| NO₂ | 2,2,4-tri-CH₃ | $-C_2H_4-N(CO-CH_2)(CH_2-CH_2)$ (morpholinone) |
| CN | 2-CH₃—7-NHCOCH₃ | $-C_2H_4NHCO-C_6H_5$ |
| Cl | 2,2,4-tri-CH₃—7-NHCOCH₃ | $-C_2H_4NHCO-C_6H_4-OCH_3$ |
| H | 2,—CH(CH₃)₂—7-NHCOCH₃ | $-CH_2CH_2-S-C(=N-NH-CH=N)$ (triazole) |
| NO₂ | 7-CH₃ | $-CH_2CH_2-N(CO-C_6H_4-CH_2)$ (isoindolinone) |
| CN | 3-CN—7-CH₃ | $-C_2H_4OH$ |
| Cl | 3-CONH₂—7-CH₃ | $-CH_2CH_2-N(CO-C_6H_4-SO_2)$ (benzothiazinone) |
| H | 2,2,4,7-tetra-CH₃ | $-CH_2CH_2OCNH-C_6H_5$ |
| H | 2,2,4,7-tetra-CH₃ | $-CH_2CH_2N$(phthalimide) |

TABLE III

Structure: R-phenyl-CH=CH-C(thiadiazole)-N=N-benzoxazine with R⁶, R⁸, R¹⁰

| R | R⁶, R¹⁰ | R⁸ |
|---|---|---|
| H | 3,6-di-CH₃ | $-C_2H_4OH$ |
| NO₂ | 3-CH₃ | $-CH_2CH(OH)CH_2OH$ |
| CN | 3-CH₃—6-NHCOCH₃ | $-C_2H_4CONH_2$ |
| Cl | 6-NHCOCH₃ | $-C_2H_4NHCOCH_3$ |
| H | 3,6-di-CH₃ | $-C_2H_4CN$ |
| NO₂ | 3-CH₃ | $-C_2H_4Cl$ |
| CN | 3-CH₃—6-NHCOCH₃ | $-C_2H_4OOCC_2H_5$ |
| Cl | 6-NHCOCH₃ | $-C_2H_4OC_2H_5$ |
| H | 3,6-di-CH₃ | $-C_2H_4CONHC_2H_5$ |
| NO₂ | 3-CH₃ | $-C_2H_4CONH(C_2H_5)_2$ |
| CN | 3-CH₃—6-NHCOCH₃ | $-C_2H_4CONHCH_2C_6H_5$ |
| Cl | 6-NHCOCH₃ | $-C_2H_4OOCOC_2H_5$ |
| H | 3,6-di-CH₃ | $-C_2H_4NHCOCH=CH_2$ |
| NO₂ | 3-CH₃ | $-CH_2C_6H_5$ |
| CN | 3-CH₃—6-NHCOCH₃ | $-C_2H_4CONHCH_2OH$ |
| Cl | 6-NHCOCH₃ | $-C_3H_6NHCONHC_2H_5$ |
| H | 3,6-di-CH₃ | $-C_2H_5$ |
| NO₂ | 3-CH₃ | $-C_2H_4SO_2NH_2$ |
| CN | 3-CH₃—6-NHCOCH₃ | $-C_2H_4SO_2NHC_2H_5$ |
| Cl | 6-NHCOCH₃ | $-C_2H_4SCH_3$ |

TABLE III-continued

| R | R⁶, R¹⁰ | R⁸ |
|---|---|---|
| H | 3,6-di-CH₃ | -CH₂CH₂S-C(=N)... benzothiazole |
| NO₂ | 3-CH₃ | -CH₂CH₂-S-C(=N)-NH-CH-N (imidazoline) |
| CN | 3-CH₃—6-NHCOCH₃ | -CH₂CH₂N(COCH₂)(COCH₂) |
| Cl | 6-NHCOCH₃ | -C₂H₄O-C₆H₅ |
| H | 3,6-di-CH₃ | -C₂H₄-N(CO-N-CH₃)(CO-CH₂) |
| NO₂ | 3-CH₃ | -CH₂CHCH₂OH, OH |
| CN | 3-CH₃—6-NHCOCH₃ | C₂H₄-N(CO-O)(CO-CH₂) |
| Cl | 6-NHCOCH₃ | -C₂H₄-N(CO-CH₂)(CO-CH₂) |
| CF₃ | 3,6-di-CH₃ | -C₂H₄-N(COCH₂)(CH₂)(COCH₂) |
| NO₂ | 3-CH₃ | -C₂H₄-N(CO)(CO)C₆H₄ |
| CN | 3-CH₃—6-NHCOCH₃ | -C₂H₄-N(CO-NH)(CO-CH₂) |
| Cl | 6-NHCOCH₃ | -C₂H₄-N(COCH₂)(COCH₂)O |
| H | 3,6-di-CH₃ | -C₂H₄-N(CO-C₆H₄-SO₂) |
| NO₂ | 3-CH₃ | -C₂H₄-N(CO-S)(CO-CH₂) |
| CN | 3-CH₃—6-NHCOCH₃ | -C₂H₄-S-C(=N)-N(NC₂H₄CN)-CH |
| Cl | 6-NHCOCH₃ | -C₂H₄-N(CO-CH₂)(CH₂-CH₂) |
| H | 3,6-di-CH₃ | -C₂H₄NHCO-C₆H₅ |
| NO₂ | 3-CH₃ | C₂H₄NHCO-C₆H₄-OCH₃ |
| CN | 3-CH₃—6-NHCOCH₃ | -CH₂CH₂-S-C(=N)-NH-CH-N |
| Cl | 6-NHCOCH₃ | -CH₂CH₂-N(CO-C₆H₄-CH₂) |
| H | 3,6-di-CH₃ | -C₂H₄OH |
| NO₂ | 3-CH₃ | -CH₂CH₂-N(CO-C₆H₄-SO₂) |
| NO₂ | 3,6-di-CH₃ | -CH₂CH₂OCNH-C₆H₅ |
| H | 3,6-di-CH₃ | -CH₂CH₂N(CO-C₆H₄-CO) |

The invention has been described in detail with particular reference to preferred embodiments thereof, but it will be understood that variations and modifications can be effected within the spirit and scope of the invention.

I claim
1. The process for the preparation of the compound

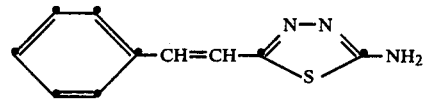

comprising reacting in water at from about 40° to about 100° C., ferric ammonium sulfate dodecahydrate and cinnamaldehyde thiosemicarbazone wherein the reactants are present in a mole ratio of from about 1:1 to about 5:1.

* * * * *